UNITED STATES PATENT OFFICE.

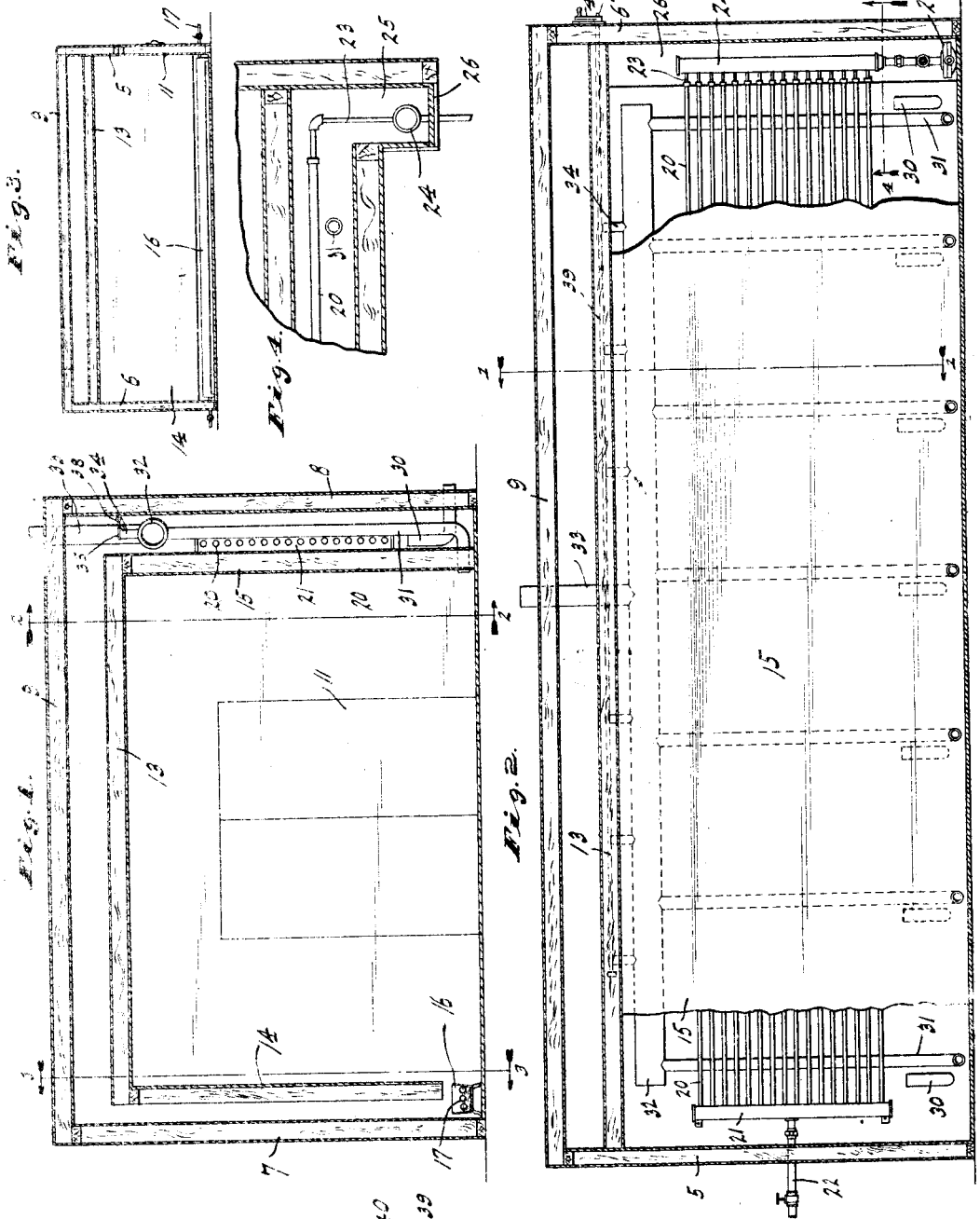

HARRY HUNTER, OF INDIANAPOLIS, INDIANA.

DRY-KILN.

1,067,921.　　　　Specification of Letters Patent.　　Patented July 22, 1913.

Application filed January 2, 1913. Serial No. 739,649.

*To all whom it may concern:*

Be it known that I, HARRY HUNTER, a citizen of the United States, residing at Indianapolis, in the county of Marion and State of Indiana, have invented a new and useful Dry-Kiln, of which the following is a specification.

The object of my invention is to produce a dry kiln in which freshly varnished articles, freshly glued articles, etc., may be dried and hardened at a rapid rate, without injury to the articles.

The accompanying drawings illustrate my invention.

Figure 1 is a vertical transverse section, substantially on the line 1—1 of Fig. 2, of a dry kiln constructed in accordance with my invention; Fig. 2 is a section on the line 2—2 of Fig. 1; Fig. 3 is a reduced section on the line 3—3 of Fig. 1; Fig. 4 is a section on the line 4—4 of Fig. 2; and Fig. 5 is an enlarged detail of the recirculation controlling device.

A substantially closed room or compartment is formed by end walls 5 and 6, side walls 7 and 8, and a ceiling 9, all of which are preferably properly heat insulated and one or more of the walls being provided with a door 11. A horizontal partition 13 is located within this compartment and near the ceiling, said partition being spaced from two opposite walls of the room as shown in Fig. 1, but preferably extending the entire distance between the other two walls as shown in Fig. 3. Two vertical partitions 14 and 15 extend downward from the two edges of the horizontal partition 13 which are spaced from the side walls of the room, the partition 15 preferably extending entirely to the floor as shown in Figs. 1 and 2, and the partition 14 being spaced from the floor as shown in Figs. 1 and 3. The drying chamber or inner compartment is between the partitions 14 and 15 and beneath the partition 13. A water pan 16, conveniently extending substantially the entire length of the compartment as shown in Fig. 3, is located at the lower edge of the passage between the partition 14 and the adjacent side wall 7 and may be provided with steam heating pipes 17 if desired.

Within the space between the partition 15 and the adjacent side wall 8 is located a set of heating pipes 20, said pipes terminating at one end in a vertical header 21 connected to the supply pipe 22 and at the other end being connected by L-shaped connections 23 to a vertical header 24. The header 21 is located in the space between the partition 15 and the adjacent side wall 8, but the header 24 is located in a wing 25 of such space, such wing being provided with a door 26 which allows convenient access to such header. The header 24 discharges through a trap 27.

A series of elbow pipes 30 lead from the atmosphere through the wall 8 into the lower part of the space between the partition 15 and said wall, their inner ends opening upward beneath the steam pipes 20. A second series of elbow pipes 31 project through the partition 15 near the bottom thereof and extend upward in the space between such partition and the wall 8, terminating at their upper ends in a horizontal header 32 extending lengthwise of such space and communicating with the atmosphere through a discharge pipe 33 extending through the ceiling 9. The header 32 is also provided with a series of small discharge pipes 34, which open upwardly beneath such ceiling. The pipes 34 may be provided with dampers 35 pivoted at 36 and having projections 37 coöperating with arms 38 on a common adjusting shaft 19 having at one end an operating handle 40.

In operation, the air within the space between the partition 15 and the side wall 8, as well as the air within the pipes 31 and the header 32, is heated by the steam pipes 20, so that there is created a tendency for such air to rise. This causes air to be drawn into such space through the pipes 30 and air to be drawn out of the drying chamber between the partitions 14 and 15 and beneath the horizontal partition 13 through the pipes 31, this latter air passing part to the atmosphere through the pipe 33 and part back into the space within the closed compartment through the pipes 34. Thus a continual circulation of air is produced, the air passing upwardly through the space between the partition 15 and the wall 8, horizontally in the space between the horizontal partition 13 and the ceiling 9 downwardly between the partition 14 and the adjacent side walls, thence into the drying chamber, and thence out through the pipes 31, the header 32, and the discharge pipe 33. By reason of the pipes 34, some of the air recirculates, and at the same time fresh air is continually being supplied through the pipes 30 to take the place of that which is discharged through the pipe 33. The proportionate part of the air which re-circulates is controlled as desired by adjusting the arm 40 and the dampers 35 operated thereby. The air is properly humidified at the water pan 16 before it passes into the drying chamber.

I claim as my invention:

1. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space and an air passage leading to the atmosphere from the inside of the space within the inner compartment, said last named passage having a branch passage opening into the space between the inner and outer compartments.

2. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space and an air passage leading through said last named space to the atmosphere from the inside and near the bottom of the space within the inner compartment.

3. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space and an air passage leading through said last named space to the atmosphere from the inside and near the bottom of the space within the inner compartment, said last named passage having a branch passage opening into the space between the inner and outer compartments.

4. A dry kiln consisting of a main or outer compartment and an inner compartment spaced from the outer compartment at the top and at the two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space and an air passage leading through said last named space to the atmosphere from the inside of the space within the inner compartment.

5. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space, and an air passage leading to the atmosphere from the inside and near the bottom of the space within the inner compartment.

6. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space and discharging upwardly beneath said heating coil, and an air passage leading to the atmosphere from the inside of the space within the inner compartment.

7. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a water pan arranged at such point of communication, a heating coil for heating the contents of said water pan, a heating coil in the space between the opposite side wall of the inner compartment and the adjacent side wall of the outer compartment, an air inlet passage leading from the atmosphere into the lower part of such last named space, and an air passage leading to the atmosphere from the inside of the space within the inner compartment.

8. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a water pan arranged at such point of communication, a heating coil in the space between the opposite side wall of the inner compartment and the adjacent side wall of the outer compartment, an air inlet passage leading from the atmosphere into the lower part of such last named space, and an air passage leading to the atmosphere from the inside of the space within the inner compartment.

9. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space, and an air passage leading to the atmosphere from the inside of the space within the inner compartment.

10. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space, and an air passage leading to the atmosphere from the inside of the space within the inner compartment, said last named passage having a branch passage opening into the space between the inner and outer compartments, and means for controlling the proportionate part of the air which passes through said branch passage.

11. A dry kiln consisting of a main or outer compartment and an inner compartment spaced from the outer compartment at the top and at two opposite sides, the space within the inner compartment communicating with the space between the two compartments substantially at the bottom of one of the side walls of the inner compartment, a heating coil in the space between the opposite side wall of the inner compartment and the adjacent side wall of the outer compartment, an air inlet passage leading from the atmosphere into the lower part of such last named space, and an air passage leading through said last named space to the atmosphere from the inside and near the bottom of the space within the inner compartment, said last named passage having a branch passage opening into the space between the inner and outer compartments, and means for controlling the proportionate part of the air which passes through said branch passage.

In witness whereof, I have hereunto set my hand at Indianapolis, Indiana, this 11th day of April, A. D. one thousand nine hundred and thirteen.

HARRY HUNTER.

Witnesses:
FRANK A. FABLE,
G. B. SCHLEY.